United States Patent [19]

Johnson et al.

[11] Patent Number: 5,415,783
[45] Date of Patent: May 16, 1995

[54] METHOD FOR USING OZONE IN COOLING TOWERS

[75] Inventors: Donald A. Johnson; Richard J. Strittmatter, both of Batavia; Binaifer S. Khambatta, Orland Park, all of Ill.

[73] Assignee: Nalco Chemical Company, Naperville, Ill.

[21] Appl. No.: 165,689

[22] Filed: Dec. 13, 1993

[51] Int. Cl.$^6$ .................................................. C02F 1/78
[52] U.S. Cl. ........................... 210/699; 210/698; 210/760; 210/764; 422/15
[58] Field of Search ............................... 210/696–701, 210/760, 764; 422/9, 15–17, 13

[56] References Cited

U.S. PATENT DOCUMENTS

| | | | |
|---|---|---|---|
| 4,172,786 | 10/1979 | Humphrey et al. | 210/760 |
| 4,541,989 | 9/1985 | Foller | 204/176 |
| 4,547,294 | 10/1985 | Goeldner | 210/697 |
| 5,145,585 | 9/1992 | Coke | 210/760 |
| 5,171,451 | 12/1992 | Khambatta et al. | 210/760 |
| 5,186,841 | 2/1993 | Schick | 210/760 |
| 5,252,300 | 10/1993 | Hinchliffe | 422/186.07 |

OTHER PUBLICATIONS

Technical Paper No. TP89-07; Ozone Treatment of Cooling Water: Results of a Full-Scale Performance Evaluation; Coppenger, Crocker, Wheeler; pp. 1–25; 1989 Cooling Tower Institute Annual Mtg.—Jan. 23–25, 1989.

Primary Examiner—Peter A. Hruskoci
Attorney, Agent, or Firm—Robert A. Miller; James J. Drake

[57] ABSTRACT

A method for increasing the effectiveness of ozone as a treating agent for alkaline cooling tower waters. This is accomplished by reducing pH of the solutions in contactor loops which supply ozone to cooling tower waters with an acidic substance.

11 Claims, 1 Drawing Sheet

METHOD FOR USING OZONE IN COOLING TOWERS

FIELD OF THE INVENTION

The invention relates to an improved method for using ozone in the treatment of industrial cooling waters.

INTRODUCTION

The introduction of ozone into a cooling system produces well-known benefits, most notably the efficient destruction of biological growth. Ozone is typically produced in a gas phase either by exposing the gas phase to electrical energy in the form of a corona discharge, by electrochemical processes or through other means.

In order to use ozone in an aqueous system, it is necessary to transfer ozone from the gas phase into a liquid phase and then to introduce the ozone-containing solution into the aqueous system in such a way that an effective concentration of ozone is delivered to the critical points in the system. Due to the high reactivity of ozone in solution, this process can be difficult.

A typical ozone injection system for cooling water systems includes a source of dry, clean compressed air which is passed through an ozone generator. Depending on the type of ozone generator used, a stream containing 1–30% ozone in air is generated. This gas stream is then passed into a contactor in which the ozone laden gas stream is intimately mixed with an aqueous stream (the contactor loop). This aqueous contractor stream is generally a side stream loop of the recirculating system. The same principle would apply to contacting cooling system make-up water and the term sidestream contactor loop as used herein is meant to also apply to the introduction of ozone into cooling system makeup water. Ozone is dissolved in the recirculating system loop (contactor loop) from the gas stream resulting in an ozone rich aqueous stream which is then reinjected into the cooling waters. Most cooling systems operate under alkaline conditions having a pH greater than 8. The ozone concentration in the aqueous sidestream ozone contactor loop can be quite high. Since dissolved ozone is quite unstable and reactive, significant amounts of ozone can be lost in the contactor loop. Coppinger et. al., *Ozone Treatment of Cooling Water: Results of a Full-Scale Performance Evaluation*, presented at the 1989 Cooling Tower Institute Annual Meeting, New Orleans, La., Jan. 23–25, 1989, demonstrated that 88% of the ozone produced by the generator can be lost in the contactor loop.

Under current practice, ozone is introduced into an aqueous system by passing a side stream of the system through a gas/liquid contactor in which ozone is transferred from a gas phase to the aqueous phase (contactor loop). This process results in a relatively high concentration of ozone in the aqueous phase after the contactor. In aqueous solution ozone degrades rapidly either through reactions with dissolved oxidizable materials or through self-destructive radical pathways. It has been previously shown that much of the ozone introduced into the system is lost in the contactor and is never effectively introduced into the aqueous system.

BRIEF DESCRIPTION OF THE INVENTION

This invention is directed to a method for increasing the effectiveness of ozone as a treating agent in alkaline cooling water systems using a sidestream ozone contactor loop for the introduction of ozone, and for improving the stability of ozone-reactive organic water treatment agents in such systems which comprises reducing the pH of alkaline cooling water in said sidestream ozone contactor loop prior to or simultaneously with the addition of ozone to a pH value below 8.0 and preferably 7.5 by the addition of an acid to the water in the ozone contactor loop.

It has been discovered that by lowering the pH of the contactor water stream prior to the introduction of ozone, or simultaneously with the introduction of ozone, the decomposition of ozone can be inhibited. The pH reduction can be accomplished by the addition of strong acids or preferably gaseous carbon dioxide into the stream either in or before the ozone contactor. The addition of carbon dioxide is preferred because it reduces pH with attendant reductions in ozone reactivity and decomposition rates without a permanent reduction in the total or "M" alkalinity. The use of strong acids such as mineral acids produces a reduction in both pH and total alkalinity.

The resulting improvement in contactor performance will allow reduction of the flow rate in contactor loop required to inject the necessary amount of ozone into the cooling tower system. This will help reduce or eliminate the exposure of treated cooling tower water in the contactor loop. Reduction or elimination of the exposure of treated cooling tower water to the high ozone concentration in the contactor loop will reduce or eliminate the degradation of contactor components by ozone. This benefit would be particularly advantageous in the event that high capacity ozone generating technology (such as that described in U.S. Pat. No. 4,541,989 Foller et. al.) becomes available. Such technology would facilitate the production of high-concentration aqueous ozone streams, in which case the stability of the ozone residual would be even more critical.

A further benefit of this invention is the reduction of the reactivity of ozone with many organic additives used for scale and deposit control in water treatment systems. The data presented hereafter shows that reducing the pH gives a significant reduction in ozone reactivity to a variety of treatment actives. The pH of the cooling system as a whole cannot typically be independently varied without causing disturbances in the corrosion and scale properties of the water. The practice of this invention allows reduction of the reactivity of treatment components in the contactor loop which is the area where ozone is most concentrated.

Another benefit of this invention is the potential for modifying the distribution of ozone throughout the system. By stabilizing the ozone residual in the contactor loop it becomes possible to inject the ozone-bearing contactor water into various points of a cooling system. This would allow the ozone to be more effectively delivered to the critical points of the cooling system (for example the deck of an open deck tower) where biocontrol is most needed.

It has been demonstrated in the literature that the concentration of alkalinity in an ozone treated cooling water system is extremely important in determining the mild steel corrosion rate (R. J. Strittmatter, B. Yang, D. A. Johnson, *Ozone Science and Engineering*, Vol. 15, 1993, 47–80; B. Yang, D. A. Johnson, S. H. Shim, *Corrosion*, Vol. 49, 1993, 499–513). As the alkalinity decreases, the corrosion rate increases. In any given system, a minimum alkalinity exists below which mild steel corrosion is unacceptable. It has also been demonstrated that calcium carbonate scale can form in ozone-treated cooling water systems due to the concentration of calcium and alkalinity exceeding their solubility limit at a given operating pH and temperature. Reducing the pH of the recirculating water reduces the likelihood of calcium carbonate scale formation. It follows that reducing the pH without reduction of the alkalinity in the water such as that achieved by the addition of carbon dioxide will not only increase the stability of ozone, but also decrease the likelihood of scale formation while maintaining mild steel corrosion protection.

The Invention

Figure 1:
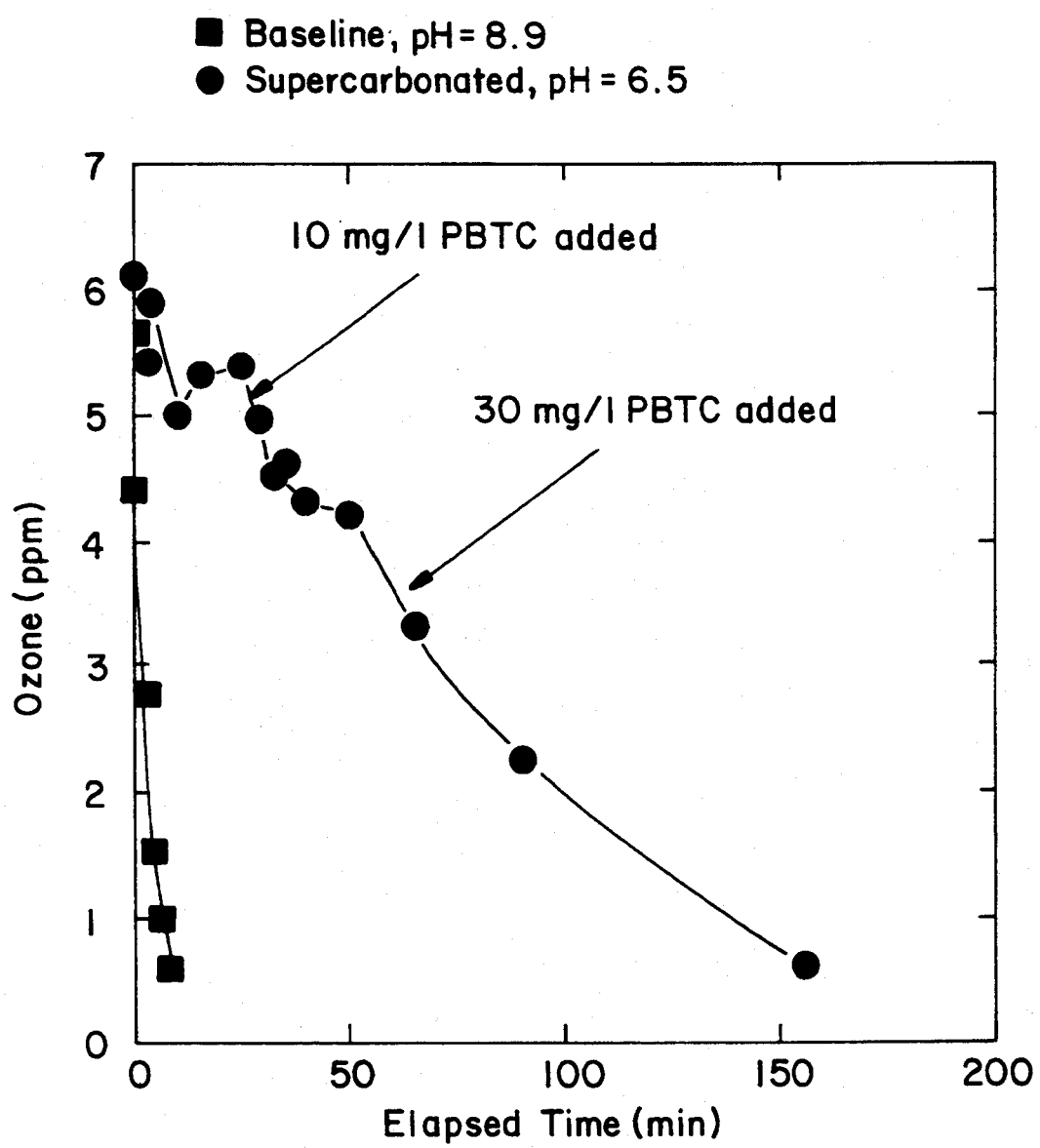
FIG. 1 is a graphical representation of experimental results showing the decomposition of ozone at two different pH values. The experiment is described in full in Example 1 presented herein.

The invention specifically comprises a method for increasing the effectiveness of ozone as a treating agent to control biological growth where ozone is fed from a contactor loop as an ozone solution to alkaline cooling tower waters which comprises adjusting the pH of the ozone solutions in the contactor loop to below 8.0 prior to feeding to the cooling water.

In a preferred embodiment of the invention, the pH of the ozone solution in the contactor loop is adjusted to below 8.0, and most preferably, to below a pH of 7. Generally, the pH will be adjusted to a value of between 8.0 and 3.0. Preferably the pH is adjusted to a value of between 7.5 and 5 and most preferably to a pH value between 7 and 6.5. As previously indicated, while a variety of water soluble acids may be used to accomplish pH adjustment of the contactor stream such as mineral acids e.g. hydrochloric and sulfuric acids, the preferred embodiment of the invention is to use gaseous carbon dioxide. When gaseous carbon dioxide is used it is bubbled into the gas stream in an effective amount to obtain the pH value designated above. When mineral acids are employed, they are typically added as dilute aqueous solutions to the contactor stream ahead of ozonation to obtain the designated pH value. Other pH adjustment additives such as organic acids may be utilized, but are not preferred since they may react with ozone. Preferred mineral acids for use in this invention are hydrochloric, sulfuric, nitric and phosphoric. Most preferable mineral acids are hydrochloric and sulfuric. Equipment utilized to add mineral acids or carbon dioxide to the contactor loop are well known to those skilled in the art. Likewise, methods to measure the pH of the contactor loop will be understood by those familiar with the art of cooling water system treatment. While some nitrogen oxide materials may be formed in corona discharge ozone systems, the amount of nitrogen oxides produced is not sufficient to lower the pH of alkaline cooling water to the levels contemplated in this invention.

As stated above, the ozone injection technique of this invention results in less destruction of organic cooling water scale and corrosion control additives providing a savings to those utilizing this invention in combination with organic based treatment chemicals. Exemplary organic based treatment chemicals include anti-foam agents, scale control agents, corrosion control chemicals, dispersants and bio-dispersants. Examples of specific materials include organo-phosphonate scale and corrosion control additives such as 1-hydroxyethylidene 1,1-diphosphonic acid (HEDP), 2-phosphonobutane 1,2,4 tricarboxylic acid (PBTC), and aminiotrismethylenephosphonic acid (AMP). Other additives which may be used and which will benefit from the subject invention include low molecular weight polymers such as polyacrylic acid, and copolymers of acrylic acid with acrylamide which are used as dispersants and treatment agents, and certain copper or yellow metal corrosion inhibitors such as tolyltriazole and benzotriazole. Other organic additives such as ethoxylated nonylphenols and ethylene oxide-propylene oxide block copolymers used as bio-dispersants may also benefit from the practice of this invention.

EVALUATION OF THE INVENTION

Example 1

The results of this example demonstrate the effect of carbon dioxide addition on the kinetics of self-destruction of ozone in solution. It illustrates the effect which the invention would have upon the behavior of dissolved ozone in the contactor of an ozone delivery system.

In order to provide a baseline of ozone decomposition under cooling tower conditions, four liters of test solution were prepared by the addition of 2 grams of sodium bicarbonate to four liters of deionized water. This test solution contains a total alkalinity of 300 mg/l (expressed as $CaCO_3$). The initial pH of this solution was approximately 7.5. The test solutions were kept at room temperature throughout the experiments. Laboratory compressed air was bubbled through the test solution until a constant pH (8.8) was reached. This pH-alkalinity relationship is typical of what would be observed in an operating cooling tower. Once the constant pH is observed, bubbling of an ozone-containing gas stream produced by a corona-discharge ozone generator into the solution was commenced.

Ozone was analyzed by removing aliquots (volume varied depending on expected ozone concentration) from test solutions, quickly putting the aliquots into a fixing solution of potassium iodide and subsequently titrating the residual oxidant with ferrous ammonium sulfate to a DPD ($N_1$N-diethyl-p-phenylene diamine) end point.

Sample aliquots were taken and analyzed and once a constant level of ozone (ca. 5 mg/l) was obtained, all gas bubbling was ceased and the solution was allowed to become quiescent. Sample aliquots continued to be taken and analyzed by the previously described procedure until the ozone decayed to low levels. The results of this experiment are shown in FIG. 1. as the base rate of ozone decomposition in simulated cooling tower water.

An additional experiment was conducted using the above procedure, but with the additional infusion of a carbon dioxide-enriched gas stream into the water during the ozone introduction, resulting in a constant solution pH of 6.2–6.5. The results of this comparison are illustrated in FIG. 1. The comparison between the baseline and super carbonated cases illustrates the improved ozone stability realized by the invention. During the first 25 minutes of the super carbonated case of Example 1, as shown on FIG. 1, no organic additives were present in the test solution. At 25 minutes into the experiment, 10 mg/l of 2-phosphonobutane-1,2,4-tricarboxylic acid (PBTC), a commonly-used cooling water scale inhibitor, was added to the test solution. After 50 minutes, an additional 30 mg/l of PBTC was added to the solution. No major effect on the decomposition rates was observed upon these additions. At the conclusion of the experiment, the test solution was analyzed for organic and inorganic phosphorous content. This analysis showed only 6% of the total (organic+inorganic) phosphorous was in the inorganic form.

Example 2

Example 2 is a more detailed evaluation of the improvements in inhibitor stability derived from the invention. Two cooling water scale/corrosion inhibitors were exposed to ozone under typical cooling water conditions and under conditions produced by the invention. The inhibitors used in this example are exemplary of an oxidant-stable inhibitor, 2- phosphonobutane-1,2,4-tricarboxylic acid (PBTC), and an oxidant-unstable inhibitor, 1-hydroxyethylidine-1,1-diphosphonic acid (HEDP). The stability of each of these inhibitors toward destruction by ozone was evaluated in medium hardness buffered water which produced an equilibrium pH approximately 9 and in unbuffered deionized water which produced an equilibrium pH of approximately 4.

The ozonation experiments described in this example, were conducted using a PCI Ozone and Control Systems, West Caldwell, N.J., Model GL-1 ozone generator using laboratory compressed air to produce ozone. Glass frits were used to bubble ozone from the generator directly to the test water. Air flow was controlled from the ozone generator and was varied along with the ozone output, depending on the experiment. Residual ozone concentrations were determined by the colorimetric Hach DPD ($N_1N$-diethyl- p-phenylene diamine) test method in this example. Case A: Ozonation of PBTC in deionized (DI) water (equilibrium pH=4)

A 27 mg/l solution of PBTC in DI water was ozonated at ambient temperatures for 135 minutes. Ozonation was conducted for the first 90 minutes at the lowest output setting of ~2.5% ozone. This was then increased after 105 minutes to 12.5% ozone output, and increased once more to 25% output after 120 minutes. Water samples were collected during ozonation at various intervals and submitted for phosphate analysis by High Pressure Liquid Chromatography (HPLC). The pH of the solutions were also recorded, as was the residual ozone level at the time of sample collection. The results of Case A are shown in Table A.

TABLE A

| Time (min) | SOLUTION pH | PBTC (PPM) | OZONE RESIDUAL (PPM) |
|---|---|---|---|
| 0 | 3.9 | 25.6 | 0.0 |
| 5 | 3.9 | 25.0 | 0.15 |
| 15 | 3.9 | 24.6 | 0.15–0.20 |
| 30 | 3.8 | 24.8 | 0.30 |
| 45 | 3.7 | 23.6 | 0.40 |
| 60 | 3.6 | 23.2 | 0.40–0.50 |
| 75 | 3.5 | 23.8 | 0.40–0.50 |
| 90 | 3.4 | 23.1 | 0.40–0.50 |
| 105 | 3.3 | 22.2 | 0.60–0.70 |
| 120 | 3.2 | 22.0 | 1.5 |
| 135 | 3.1 | 21.9 | 2.3 |

Case B: Ozonation of HEDP in DI water (equilibrium pH=4)

A 20 mg/l solution of HEDP in DI water was ozonated at ambient temperatures for 120 minutes. The lowest ozone output setting of 2.5% was used for the first 60 minutes, then increased to 12.5%, and finally increased to 25% ozone output after 105 minutes. Once again, water samples were collected for phosphonate analysis by HPLC, analyzed for residual ozone level and the pH of the test solution was monitored. The results of Case B are shown in Table B.

TABLE B

| Time (min) | SOLUTION pH | HEDP (PPM) | OZONE RESIDUAL (PPM) |
|---|---|---|---|
| 0 | 3.7 | 13.4 | 0 |
| 5 | 3.7 | 12.8 | 0.15–0.20 |
| 15 | 3.7 | 12.6 | 0.20 |
| 30 | 3.6 | 13.4 | 0.20 |
| 45 | 3.6 | 12.2 | 0.10 |
| 60 | 3.5 | 11.0 | 0.60–0.70 |
| 75 | 3.4 | 11.2 | 0.80 |
| 90 | 3.3 | 10.9 | |
| 105 | 3.2 | 9.9 | 0.90 |
| 120 | 3.1 | 11.0 | 0.90 |
| 135 | 3.1 | 8.5 | 0.90–1.0 |

Case C: Ozonation of PBTC in Medium Hardness Water (equilibrium pH=9);

A synthetic water containing 360 mg/l calcium, 200 mg/l magnesium [500 mg/l alkalinity (all as $CaCO_3$)], 15 ppm actives PBTC inhibitor was prepared using calcium chloride dihydrate, magnesium sulfate heptahydrate and sodium bicarbonate. This medium hardness water containing PBTC was then placed in a hot water bath at 40° C. and ozonated for 75 minutes. The first 60 minutes of ozonation was conducted at an output of 12.5% and then increased to 25% for the last 15 minutes. Water samples were collected at 15 minute intervals, pH and ozone residuals measured, and the samples collected were submitted for phosphonate analysis by HPLC. The results of Case C are shown in Table C.

TABLE C

| Time (min) | SOLUTION pH | PBTC (PPM) | OZONE RESIDUAL (PPM) |
|---|---|---|---|
| 0 | 8.0 | 16.5 | 0.0 |
| 15 | 8.9 | 12.4 | ~0.10 |
| 30 | 9.1 | 7.1 | <0.10 |
| 45 | 9.2 | 3.7 | <0.10 |
| 60 | 9.3 | 3.1 | <0.10 |
| 75 | 9.3 | 2.7 | <0.10 |

Case D. Ozonation of HEDP in Medium Hardness Water:

A 15 mg/l actives solution of HEDP in medium hardness water was also ozonated at 40° C., as described above in Case C. However, the total ozonation time was 70 minutes for the HEDP solution in medium hardness water. The results are shown in Table D.

TABLE D

| TIME (min) | SOLUTION pH | HEDP (PPM) | OZONE RESIDUAL (PPM) |
|---|---|---|---|
| 0 | 8.0 | 16.0 | 0.0 |
| 15 | 9.0 | <1.0 | <0.10 |
| 30 | 9.1 | <0.10 | |
| 45 | 8.9 | <1.0 | <0.10 |
| 60 | 9.0 | <1.0 | 0.20 |
| 70 | 8.8 | <1.0 | <0. |

The four cases of example 2 provide further illustration of the benefits of the invention. Cases A and B show the relative stability of a chlorine-stable and a chlorine-unstable organic inhibitor under conditions similar to those produced by the invention. Cases C and D illustrate the much greater rates of decomposition produced by typical current practice in ozone injection.

Example 3

This example illustrates the preferred implementation of the invention. The use of carbon dioxide to produce the previously-illustrated beneficial reductions in contactor pH does not result in the destruction of alkalinity or buffer capacity in the cooling tower system. Through practice of the invention, lower scaling rates are observed without a consequent increase in corrosion rates.

A pilot cooling tower test was performed under typical conditions for an ozone-treated cooling water system. Pilot Cooling Towers are described generally in the Strittmatter, et al article previously cited. The basin water temperature was 87° F., the return water temperature was 95° F., the water velocity was 4 feet/second, and the maximum skin temperature was 102° F. Ozone was added to the water by means of a venturi injector in a side-stream loop off of the basin. The make-up water for the tests contained 58 mg/l of Ca and 74 mg/l of "M" alkalinity (both as $CaCO_3$). The recirculating water was concentrated by evaporation to eight cycles of concentration. The operating pH of the water was 8.4–8.6, which is the pH that such a system naturally reaches under recirculating conditions at eight cycles of concentration. A second pilot cooling tower test was performed under identical conditions with the exception that the operating pH of the recirculating water was adjusted to 7.6–7.7 by addition of carbon dioxide to the water. The results of the two tests are given in the Table E.

TABLE E

| Test Parameter | No carbon dioxide | pH adjusted with carbon dioxide |
| --- | --- | --- |
| Average Calcium Concentration | 109 mg/l | 219 mg/l |
| Average "M" alkalinity | 200 mg/l | 299 mg/l |
| Average tube deposit rate mg/cm$^2$/yr | 80.4 mg/cm2yr | 0.7 |
| Mild steel corrosion rate | 10.6 mpy | 9.3 mpy |
| Average ozone concentration | 0.01 mg/l | 0.03 mg/l |

As the pH is lowered with carbon dioxide, the solubility of calcium carbonate increases as shown by the average concentrations of calcium and alkalinity. The higher solubility results in a large decrease in scale deposition on the heat-exchange surfaces. However, the lower pH does not result in an increase in the mild steel corrosion rate due to the carbon dioxide not destroying the alkalinity of the system. The ozone concentration increases at the lower pH, demonstrating that the stability of ozone in the system has increased.

Having thus described our invention, we claim:

1. A method for increasing the effectiveness of ozone as a treating agent for controlling biological growth in alkaline cooling water systems having a pH greater than about 8 and a sidestream ozone contactor loop for the introduction of ozone which comprises reducing the pH of the alkaline cooling water in said sidestream ozone contactor loop to a pH value below 7.0 by the addition of carbon dioxide to the water in the ozone contactor loop, wherein the carbon dioxide is added to the contactor loop at a point prior to or simultaneously with the addition of ozone into the contactor sidestream.

2. The method of claim 1 wherein the acid is added to the contactor loop at a point prior to the addition of ozone into the contactor sidestream.

3. The method of claim 1 wherein the acid is added to the contactor loop simultaneously with the addition of ozone into the contactor sidestream.

4. The method of claim 1 wherein the alkaline cooling water contains ozone reactive organic cooling water treatment chemicals.

5. The method of claim 4 wherein the ozone reactive organic water treatment agents are corrosion or scale inhibitors.

6. The method of claim 5 wherein the organic scale inhibitor is an organo-phosphonate from the group consisting of 1-hydroxyethylidene 1,1-diphosphonic acid and 2-phosphono butane 1,2,4tricarboxylic acid.

7. The method claim 6 wherein the pH value of the alkaline cooling water in the contactor loop is lowered to a pH value of between 7.0 and 5.0.

8. The method of claim 1 wherein the pH value of the alkaline cooling water in the contactor loop is lowered to a pH value between 7.0 and 5.0.

9. The method of claim 1 wherein the pH value of the alkaline cooling water in the contactor loop is lowered to a pH value of between 7.0 and 6.5.

10. The method of claim 1 wherein the pH of the alkaline cooling water in the contactor loop is reduced to a pH value between 7.0 and 5.0 simultaneously with the addition of ozone into the contactor sidestream.

11. The method of claim 1 wherein the sidestream ozone contactor loop is in the cooling system make-up water system.

* * * * *